(12) United States Patent
Henderson et al.

(10) Patent No.: US 11,193,492 B2
(45) Date of Patent: Dec. 7, 2021

(54) OPEN EXIT MOLTEN METAL GAS INJECTION PUMP

(71) Applicant: PYROTEK INC., Spokane, WA (US)

(72) Inventors: Richard S. Henderson, Solon, OH (US); Jason Tetkoskie, Cleveland Hts., OH (US); Edward W. Shilling, Sturtevant, WI (US)

(73) Assignee: PYROTEK, INC., Spokane, WA (US)

( * ) Notice: Subject to any disclaimer, the term of this patent is extended or adjusted under 35 U.S.C. 154(b) by 247 days.

(21) Appl. No.: 16/320,784

(22) PCT Filed: Jul. 24, 2017

(86) PCT No.: PCT/US2017/043464
§ 371 (c)(1),
(2) Date: Jan. 25, 2019

(87) PCT Pub. No.: WO2018/022486
PCT Pub. Date: Feb. 1, 2018

(65) Prior Publication Data
US 2020/0182246 A1    Jun. 11, 2020

Related U.S. Application Data

(60) Provisional application No. 62/366,371, filed on Jul. 25, 2016.

(51) Int. Cl.
*F04D 7/06* (2006.01)
*C22B 21/06* (2006.01)
*C22B 9/05* (2006.01)
*F04D 29/44* (2006.01)

(52) U.S. Cl.
CPC .............. *F04D 7/065* (2013.01); *C22B 9/055* (2013.01); *C22B 21/064* (2013.01); *F04D 29/445* (2013.01); *F05D 2250/52* (2013.01); *F05D 2260/607* (2013.01)

(58) Field of Classification Search
CPC ..... F04D 29/445; F04D 7/065; C22B 21/064; C22B 9/055
USPC ......................................... 266/200, 217, 235
See application file for complete search history.

(56) References Cited

U.S. PATENT DOCUMENTS

| | | |
|---|---|---|
| 4,052,199 A | 10/1977 | Mangalick |
| 4,169,584 A | 10/1979 | Mangalick |
| 5,340,379 A | 8/1994 | Tremblay et al. |
| 5,662,725 A | 9/1997 | Cooper |
| 5,993,728 A * | 11/1999 | Vild .......................... C22B 9/05 266/217 |
| 6,254,340 B1 | 7/2001 | Vild et al. |
| 6,354,796 B1 | 3/2002 | Morando |
| 6,451,247 B1 | 9/2002 | Mordue et al. |
| 8,178,037 B2 * | 5/2012 | Cooper ..................... F04D 7/00 266/239 |

(Continued)

*Primary Examiner* — Scott R Kastler
*Assistant Examiner* — Michael Aboagye
(74) *Attorney, Agent, or Firm* — Fay Sharpe LLP

(57) ABSTRACT

A molten metal pump comprised of a base defining a pumping chamber, an impeller disposed within said pumping chamber, an outlet passage extending from said pumping chamber, said outlet passage being defined by opposed top and bottom walls and opposed side walls, wherein said top and side walls terminate at an intersection with a boundary of the base and said bottom wall terminates inward from said boundary.

13 Claims, 5 Drawing Sheets

(56) References Cited

U.S. PATENT DOCUMENTS

| | | | |
|---|---|---|---|
| 8,440,135 B2* | 5/2013 | Cooper | C21C 1/06 266/235 |
| 2008/0253905 A1 | 10/2008 | Morando et al. | |
| 2015/0198162 A1 | 7/2015 | Thut | |

* cited by examiner

*View of discharge stream through window with 2" thick bottom blockage*

*Discharge stream at 16 SCFM with 3" bottom section removed*

OPEN EXIT MOLTEN METAL GAS INJECTION PUMP

BACKGROUND

In the non-ferrous metals industry, scrap recycling has become a way of economic life. In fact, long before environmental concerns and conservation began to drive scrap recycling efforts, recycling of aluminum, copper, zinc, lead and tin occupied a firm niche in the marketplace.

It is known to provide a holding portion of a furnace in which a body of molten metal is heated within an enclosure wherein controlled combustion inhibits oxidation of the molten metal. Metal solids are introduced in a well annexed to the holding portion of the furnace and molten metal is returned to the holding portion in order to maintain the temperature of the metal in the well and to deliver fresh metal to the holding portion. In the course of processing molten materials, it is often necessary to transfer the molten materials from one vessel to another or to circulate the molten materials within a vessel. Pumps for processing molten materials are commonly used for these purposes. Molten metal pumps have been described in U.S. Pat. Nos. 6,451,247; 6,354,796; 6,254,340 and U.S. Patent Publication No. US2008/0253905, each of which is herein incorporated by reference. The pumps can also be used for other purposes, such as to inject purifying gases into the molten materials being pumped.

In each of these pumps, a rotatable refractory material (graphite/ceramic) impeller is disposed within a cavity or housing of a base (usually graphite) member that is immersed in a molten material. Upon rotation of the impeller, the molten material is pumped through an outlet. The impeller itself is supported for rotation in the base member by a rotatable shaft. The shaft is rotated by a motor provided at the shaft's upper end. Several support posts extend from a motor support platform to the base member for supporting and suspending the base member within the molten material.

In the aluminum recycling industry in particular, refining processes are complicated greatly by the potency of aluminum to oxidize. Consequently, refining by oxidating reactions alone, common for other non-ferrous metals, is not feasible. Similarly, aluminum has exceptionally strong alloying characteristics with a variety of other metals. Therefore, a broad range of metallic impurities must often be removed during processing. Along these lines, the removal of magnesium has become a particular focus within the industry. The ability to remove magnesium from molten aluminum is made possible by a favorable chemical reaction between magnesium and chlorine. The reaction of the molten aluminum alloy bath with chlorine ultimately results in the formation of magnesium chloride which collects as a dross on the surface of the molten aluminum in the furnace and can be skimmed away. In many operations today, gas injection pumps are considered the most effective tool for this task. Suitable gas injection pumps are depicted in U.S. Pat. Nos. 4,052,199 and 4,169,584, herein incorporated by reference.

The injection of chlorine ultimately results in the reaction with magnesium in the alloy bath to form magnesium chloride. At the temperature of the bath, the magnesium chloride is a liquid. Generally, it rises to the bath surface where it can be removed as a mixture with the dross layer. However, the magnesium chloride can also wet solid oxide particles present in the aluminum alloy melt. This material can become lodged in the discharge region of the pump over time.

In practice, gas injection pump operators thoroughly clean the discharge region of the pump on a weekly basis. This is performed to keep the discharge region in a "as manufactured" condition to achieve complete reaction of the chlorine gas. Complete reaction of the chlorine is desired from two perspectives. First, full use of the gas to remove the theoretical limit of magnesium is advantageous from a profitability standpoint. Second, unreacted chlorine gas escaping the bath is an undesirable health and facility hazard.

However, frequent cleaning can also be detrimental. Moreover, pumps must be removed for cleaning which necessarily interrupts production. Furthermore, the pumps are typically made of graphite. While trying to remove the build-up in the discharge region, it is easy to damage the relatively soft graphite.

Various attempts have been made in the past to modify the discharge component of molten metal pumps. For example, U.S. Pat. No. 5,993,728, herein incorporated by reference discloses the utilization of a convergent nozzle positioned in the outlet passage. In U.S. Pat. No. 5,662,725, herein incorporated by reference, a gas-release device in the form of a rectangular graphite block is shown.

Although pumps of the foregoing type have been in effective operation for several years, they still suffer from a variety of shortcomings. For example, undesirable clogging of the pump outlet can occur. The present disclosure provides a mechanism for addressing this shortcoming.

SUMMARY

Figure 1:
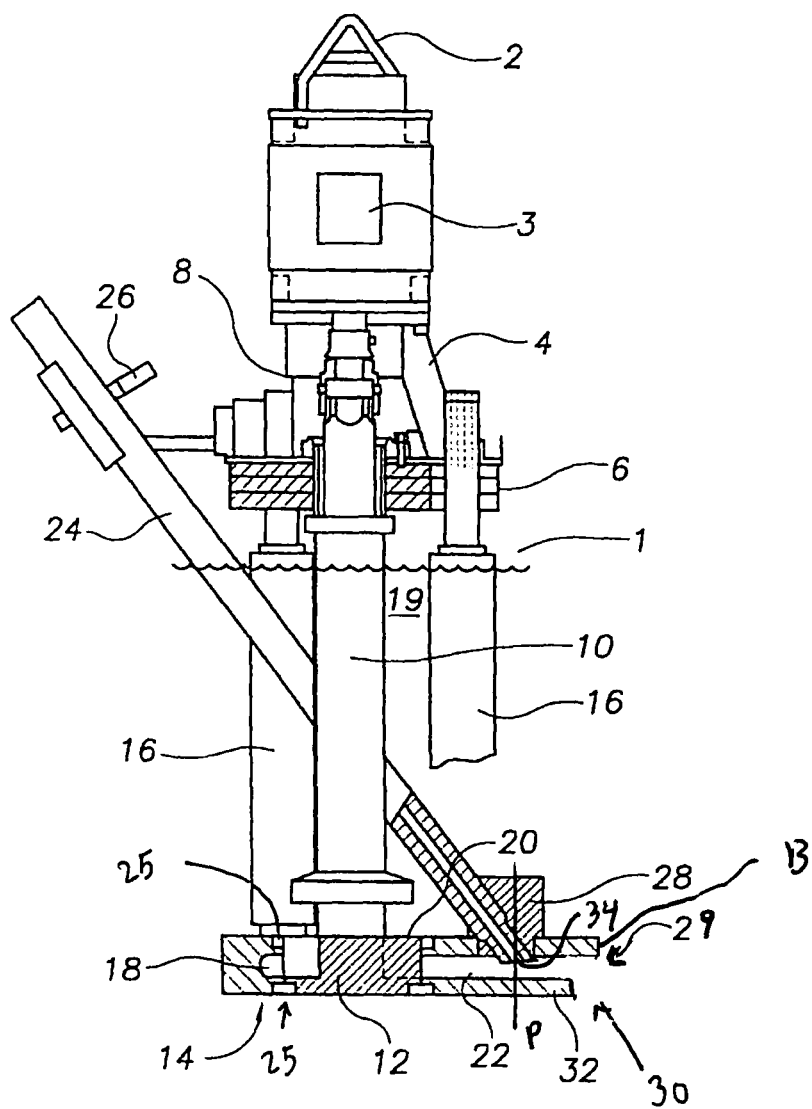
FIG. 1 is a side elevation view, partially in cross-section, of a molten metal gas injection pump of the present invention.

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

A molten metal pump includes an impeller, a pump base at least partially enclosing the impeller, a shaft connected to the impeller, a motor connected to the shaft, a motor mount plate for supporting the motor; and a post for connecting the motor mount plate to the pump base. The molten metal pump can include a connector that connects the post to the motor mount plate. The molten metal pump can include a coupling for connecting the shaft to the motor.

According to one particular embodiment, the molten metal pump includes a base defining a pumping chamber and an impeller disposed within the pumping chamber. An outlet passage extends from the pumping chamber. The outlet passage is defined by opposed top and bottom walls and opposed side walls. The top and side walls terminate at an intersection with a boundary of the base and the base wall terminates inward from the boundary. At least one of the top wall and the opposed side walls can include a gas injection inlet. The base wall can terminate at a position outward from perpendicular to the gas injection inlet. Alternatively, the base wall can terminate between the gas injection inlet and the boundary. It is also contemplated that only a center strip of the bottom wall (for example at least 25% and less than 100%) of the overall width of the bottom wall is removed.

In certain embodiments, the distance between the boundary and the gas injection inlet at which the base wall terminates can be between greater than about 10% and less than about 90% of the distance inward from the boundary. The base wall can terminate between at least about 25% and less than about 75% of the distance. Each of the walls can have a thickness of at least about 0.75 inches.

In certain embodiments, each of the opposed side walls and the top wall taper outwardly in the direction of the boundary. Alternatively, the opposed side walls can taper outwardly while the top wall remains at least substantially horizontal between the gas injection inlet and the boundary. In fact, it is noted that in certain environments, it may be desirable to provide an outlet having side walls and a bottom wall that taper outwardly downstream of the gas injection inlet while the top wall remains at least substantially horizontal. More particularly, it has been found that a tapered top wall of the outlet passage may not improve chlorine absorption while reducing mechanical strength. Accordingly, in certain embodiments it may be desirable to include tapered side and bottom outlet passage walls with a horizontal top wall.

In an alternative embodiment, the outlet passage can comprise a block or a foot (see U.S. Pat. No. 8,361,379; herein incorporated by reference) having a bottom wall with a removed portion as described above and configured for selective mating with a pump chamber exit.

DETAILED DESCRIPTION

While the invention will be described in connection with the preferred embodiment, it is to be understood that it is not intended to limit the invention to that embodiment. On the contrary, it is intended to cover all alternatives, modifications and equivalents as may be included within the spirit and scope of the invention defined by the appended claims.

Figure 2:
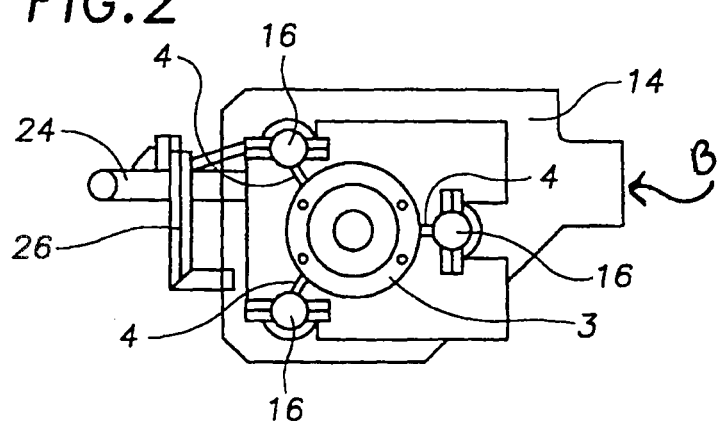
FIG. 2 is a top view of the pump of FIG. 1.

Referring now to FIGS. 1 and 2, a gas injection pump 1 is depicted. The pump 1 includes a hanger assembly 2 used for lifting and positioning of the pump as necessary within a furnace (not shown). A motor 3 is supported by a motor mount 4, itself supported by a support plate with insulation layers 6. The motor 3 is connected via a coupling assembly 8 to a rotatable shaft 10 secured to a graphite or ceramic impeller 12.

A graphite base assembly 14 is suspended above the floor of a refractory furnace from the support plate 6 by a plurality of posts 16. The impeller 12 is rotatable within a pumping chamber 18 and it's rotation draws molten metal 19 into the pumping chamber 18 through an inlet 20 and discharges the molten metal through an outlet passage 22. Ceramic bearing rings 25 are also provided.

A reactive gas is provided to a gas injection tube 24 supported by a clamping mechanism 26 attached to the support plate 6. The submerged end of the gas injection tube 24 is connected via a tube plug 28 to the outlet passage 22. Adjacent the discharge opening 29 of the outlet passage 22 is a cut out portion 30 removed from bottom outlet passage wall 32. It is envisioned that the bottom wall portion of passage 22 can be removed at any location from a point at approximately perpendicular to the gas injection tube outlet 34 (see line "P") to the boundary "B" formed by the exterior of the base assembly 14. Side walls and the top wall of the outlet passage 22 are retained.

Figure 3:
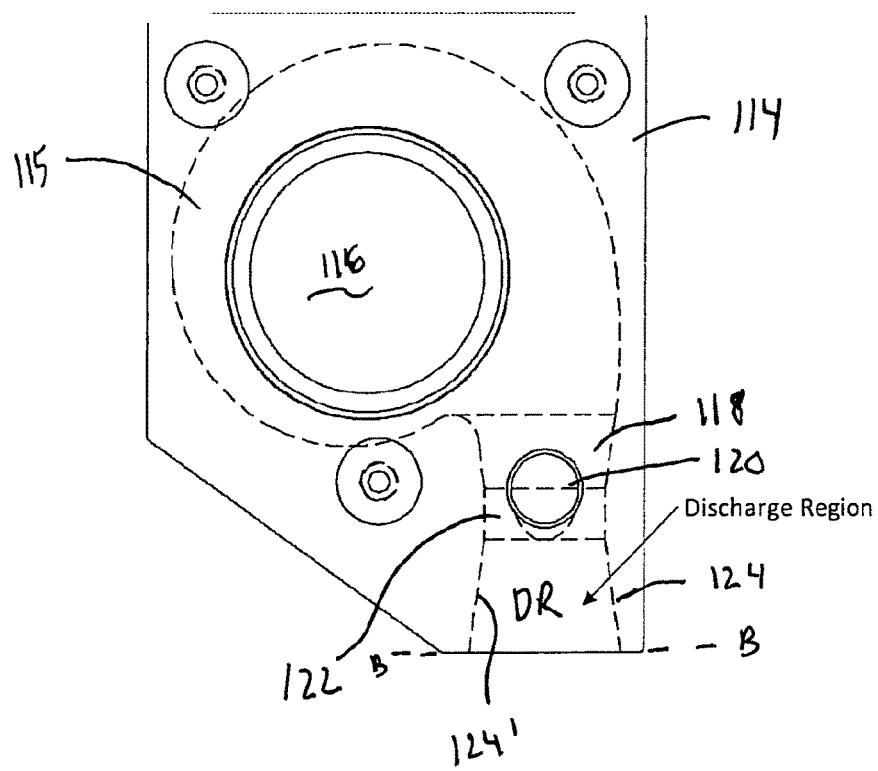
FIG. 3 is a top view, partially in cross-section, of an alternative molten metal pump base.

With reference to FIG. 3, an alternative base assembly 114 is depicted. Base assembly 114 includes a pumping chamber 115 configured to receive an impeller 116. Pumping chamber 115 is in fluid communication with outlet passage 118. Outlet passage 118 includes a gas injection tube inlet 120. According to the present disclosure the bottom wall 122 is removed from just downstream of the injection tube inlet 120 to the outer boundary B of the base assembly 114. This is reflected in the figure as the discharge region (DR). Side walls 124, 124' (and a top wall not shown) are retained and can taper outwardly.

Generally, those skilled in the art determine the effectiveness of reactivity by assessing the amount of chlorine that can be introduced into the molten aluminum per unit time. In this context, the maximum amount of chlorine solubilized in the molten aluminum per unit time is readily determinable because the intermediate aluminum chloride gas which is not reactively scavenged by the magnesium evolves to the surface and decomposes to hydrogen chloride which is visible as a white vapor when in contact with air. Under extremely poor reaction conditions, chlorine itself may not be scavenged by the aluminum and can also be directly emitted from the bath.

Accordingly, commercial gas injection pumps are operated at a level to prevent such emissions. The primary mechanism for increasing the quantity of chlorine reacted and the corresponding rate at which the magnesium level is reduced, was to operate the pump at higher speeds. Of course, this proves very stressful on the dynamic components of the pump.

EXAMPLES

Testing was performed using a J50GI pump available from the Metaullics Systems Division of Pyrotek, Inc, (Aurora, Ohio). The pump includes a gas injection tube plug fitted with a standard injection tube. The tube was shortened to 12". The 0.5" ID was threaded to accept a T-shaped steel adapter piece. Tygon tubing connected the adapter to an adjustable flow meter (0-20 SCFM). The T-adapter was also fitted with a second smaller tube adapter. The smaller adapter was connected to a pressure sensing device.

Motor speed was controlled by a variable frequency drive. The test set-up provided the opportunity to set the pump speed at any desired speed. Air flow was selected and the pressure at the pick-up point was recorded. The data sets were recorded at various speeds for different blockage configurations. "Blockages" were constructed from foam and secured to the pump discharge with through bolts and washers.

In addition, the water tank was equipped with a viewing window. This allowed visual inspection of the gas dispersion in the flowing water immediately adjacent the discharge region. The pump structure was positioned about 4" above the floor of the tank.

Five configurations were evaluated in the discharge region of the pump. They included (a) no blockage, (b) 1" blockage in the top, (c) 2" blockage in the top, (d) 1" blockage in the bottom, and (e) 2" blockage in the bottom. For each configuration the pump speed was set at 200, 250, 300, 350 and 400 rpm. At each pump speed inlet gas flows were set initially at low flow rates. The flow was increased while visually monitoring the bubble size and dispersion through the window. The observed pressure readings for the gas flow settings at 400 rpm with no blockage were determined:

| Air Flow (SCFM) | Pressure (psi) | Bubble Separation |
|---|---|---|
| 0 | −2.4 | ok |
| 2 | −1.6 | ok |
| 4 | −1.1 | ok |
| 6 | −0.7 | ok |
| 8 | −0.4 | ok |
| 10 | −0.3 | ok |
| 12 | −0.15 | ok |
| 14 | 0.0 | very very slight |
| 16 | 0.1 | very very slight |
| 18 | 0.2 | very slight |
| 20 | 0.35 | separation |

Figure 4:
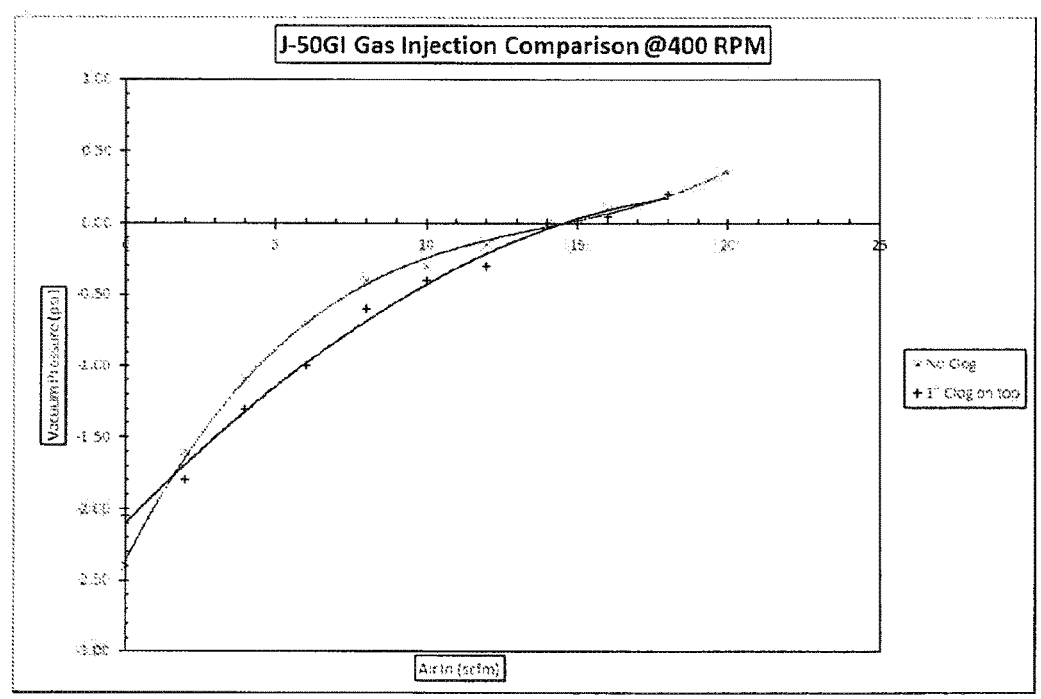
FIG. 4 is a graphical depiction of pressure readings with a 1" top blockage; 2" top blockage; and no blockage.

Graphical analysis of all of the data was performed. The data at 400 rpm yielded the most separation. The trends for the other pump speeds followed as would be expected. The FIG. 4 graph shows the pressure/air flow data for no blockage, 1" top blockage, and 2" top blockage. While the initial vacuum for zero gas flow was better with no blockage, surprisingly, the region between 2 and 14 SCFM was actually better with the 1" blockage in the roof of the outlet. For 2" of top blockage, the initial vacuum was greatly affected (increased from −2.4 psi to −1.0 psi with no gas flow). The data basically rejoined the "no blockage" data at 8 SCFM. Again, the bubble separation was basically the same for all three sets of data.

Figure 5:
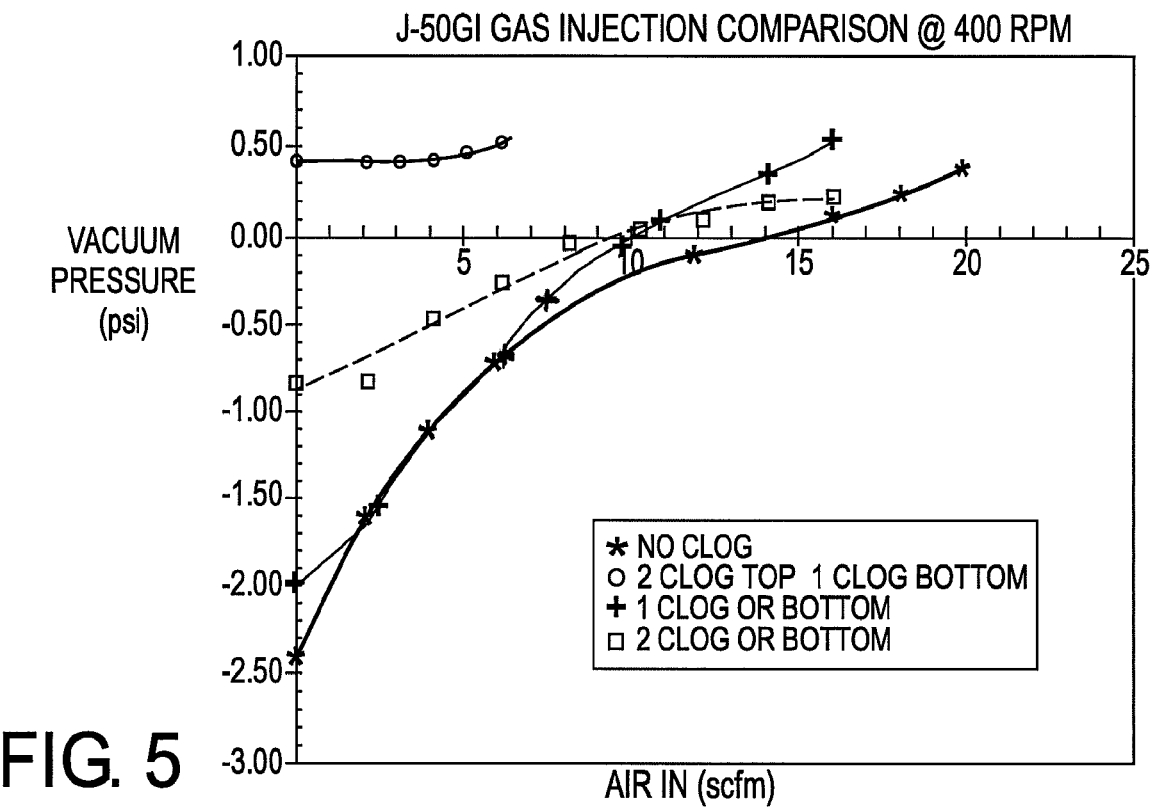
FIG. 5 is a graphical depiction of pressure readings with 1" bottom blockage; 2" bottom blockage; 2" top blockage; and no blockage.

The FIG. 5 graph depicts no blockage, 2" top blockage with 1" bottom blockage, 1" bottom blockage, and 2" bottom blockage. The result for blockages at the bottom of the exit region was surprisingly undesirable. The cross-over point at 0.00 psi occurs at 14.5, 11.5, and 10 psi respectively for the first three configurations. The understanding from this data set is to keep the bottom region of the outlet clear of magnesium chloride build-up.

Modified Base Experiments

Figure 6:
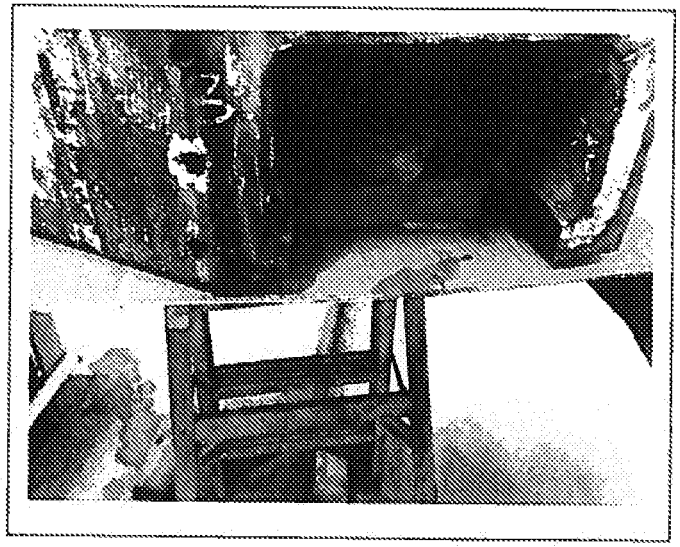
FIG. 6 is a photograph showing 3" of bottom outlet wall removed.
Figure 7:
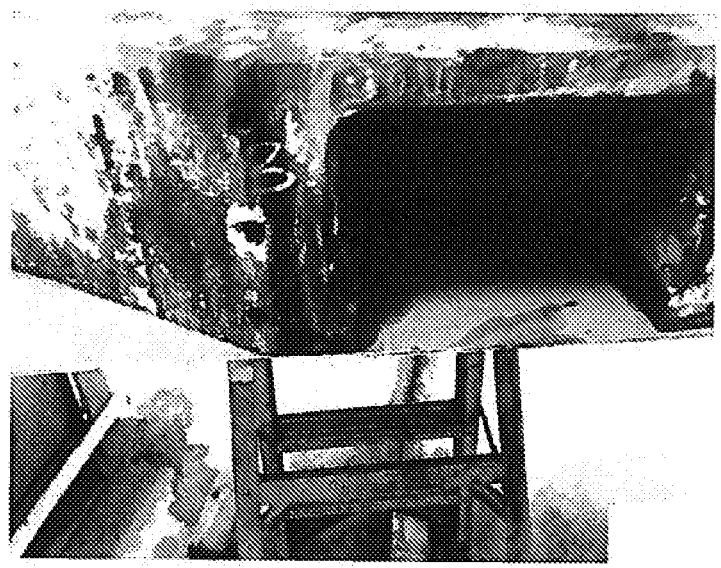
FIG. 7 is a photograph showing 6" of bottom outlet wall removed.

When the impact that blockages along the bottom of the outlet region cause was recognized, one consideration was to remove the bottom region. 3" of the outlet along the entire width of the bottom wall removed. Next, a second 3" section was removed yielding a total of 6" of the front section of the bottom of the out let was removed. FIG. 6 shows the modified base with the 3" section that was removed. FIG. 7 shows a second modification of the base to remove 6" of the bottom outlet region.

Figure 9:
FIG. 9 is a photograph of a 2" thick bottom blockage in water testing.
Figure 10:
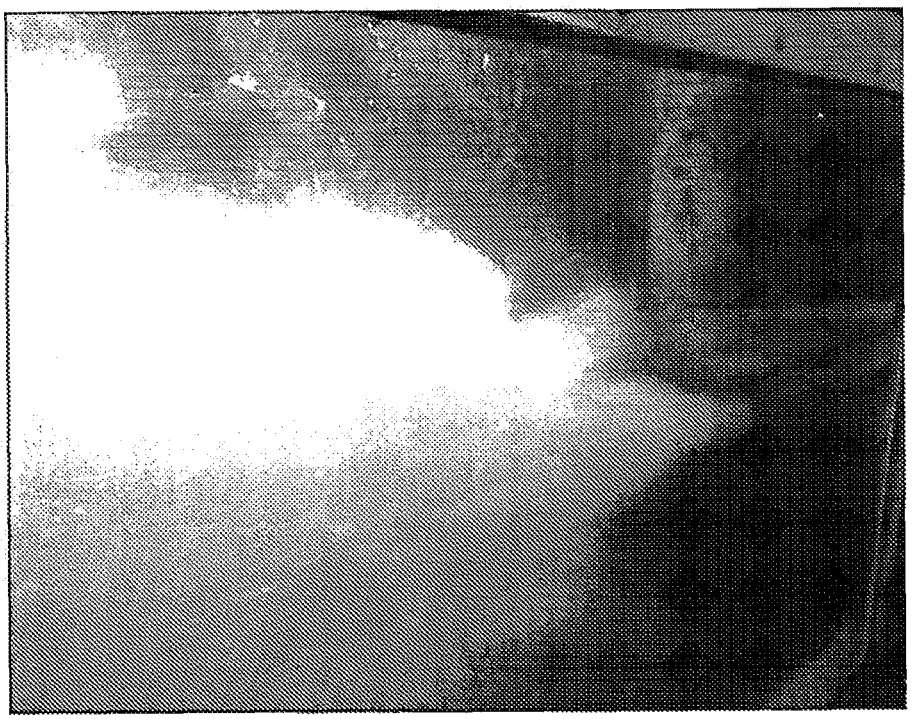
FIG. 10 is a photograph of an outlet having 3" of bottom wall removed in water testing.

Once again, data was taken at various speed settings for both configurations. As before, gas flows were set and the resultant pressure reading was recorded. With 6" removed, the turbulence in the tank downstream of the pump was high. However, with only 3" removed, the turbulence downstream was noticeable but not extreme. More importantly, the separation/pressure relationship of the pump changed. While the pressure reading at 16 SCFM was +0.50 psi, the separation was only slight. The observation at these settings was recorded in the photographs of FIGS. 9 and 10.

Figure 8:
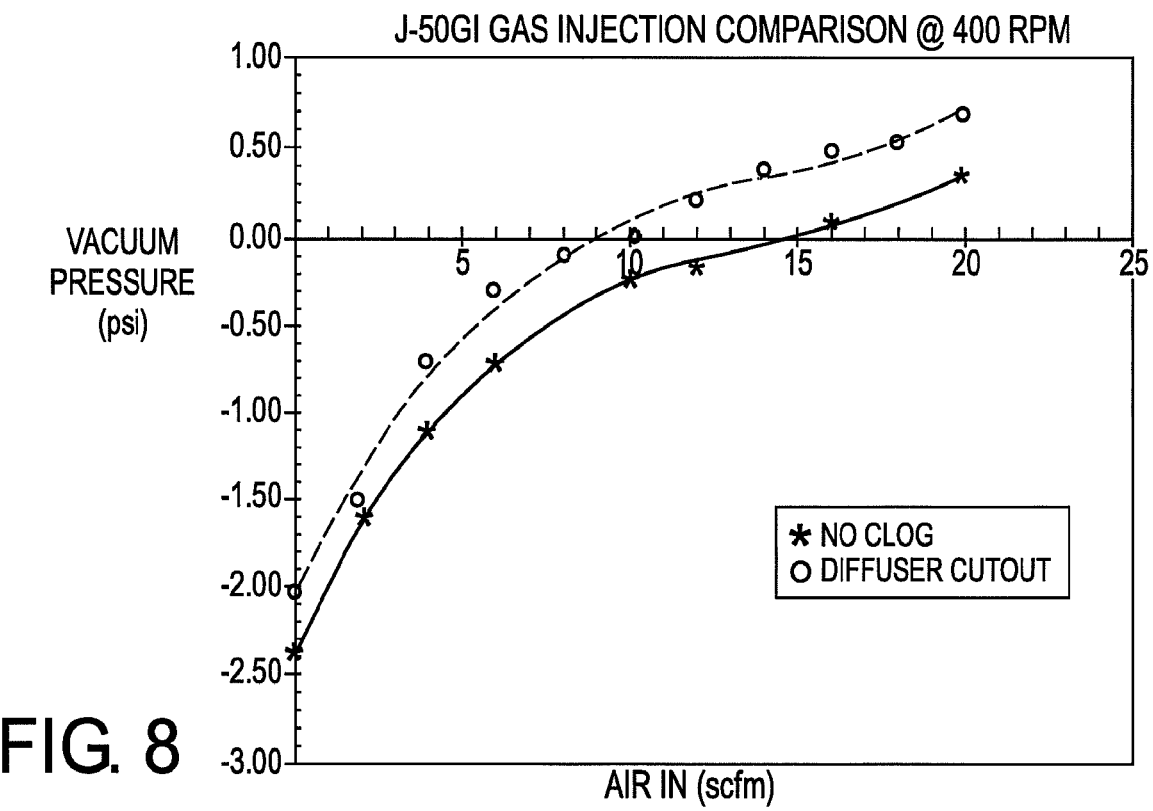
FIG. 8 is graphical depiction of a no blockage condition and a 3" section removed from the outlet bottom wall.

The graph of FIG. 8 shows the gas flow/pressure relationship at 400 rpm for the baseline no blockage condition and the base exit modified with a 3" section removed.

Field testing of the bottomless exit base (alternatively referred to as open exit) has also demonstrated the other benefits are achieved by the design. For example, not only was clogging largely eliminated, chlorine injection rates were increased. Further, the discharge pattern of molten metal/injected gas exiting the open exit pump demonstrated increased turbulence. In turn, the increased turbulence yielded an increased melt rate and thus an improvement in the overall productivity of the entire system.

A molten metal pump and the components that make up the molten metal pump have been described above in sufficient detail so that one skilled in the art can make and use the device. A number of alternatives of the above-described embodiments may occur to those skilled in the art upon reading the preceding description. The invention is meant to include all such modifications and alterations that come within the scope of the appended claims and the equivalents thereof.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A molten metal pump comprised of a base defining a pumping chamber, an impeller disposed within said pumping chamber, an outlet passage extending from said pumping chamber, said outlet passage being defined by opposed top and bottom walls and opposed side walls, wherein at least one of said top wall and said opposed side walls include a gas injection inlet, and wherein said top and opposed side walls terminate at an intersection with a boundary of the base, said top wall, said opposed side walls and said bottom wall defining an opening to said outlet passage, and wherein said bottom wall terminates inward from said top and opposed side walls.

2. The molten metal pump of claim 1 wherein said bottom wall terminates outwardly from at least substantially perpendicular to said gas injection inlet.

3. The molten metal pump of claim 2 wherein said bottom wall terminates between said gas injection inlet and said opening.

4. The molten meth pump of claim 2 having a distance between said opening and said gas injection inlet and wherein said bottom wall terminates between greater than about 10% and less than about 90% of said distance.

5. The molten metal pump of claim 4 wherein said bottom wall terminates between at least about 25% and less than about 75%.

6. The molten metal pump of claim 1 wherein said gas injection inlet is formed in said top wall.

7. The molten metal pump of claim 1 wherein each of said walls has a thickness of at least about 0.75 inches.

8. The molten metal pump of claim 1 wherein each of said opposed side walls and said top wall taper outwardly.

9. The molten metal pump of claim 1 wherein said opposed side walls taper outwardly and said top wall remains at least substantially horizontal between the gas injection inlet and the opening.

10. The molten metal pump of claim 1 wherein the outlet passage comprises a block configured for mating with a pump chamber exit.

11. A molten metal pump comprised of a base defining a pumping chamber, an impeller disposed within said pumping chamber, an outlet passage extending from said pumping chamber, said outlet passage being defined by opposed top and bottom walls and opposed side walls, wherein the top wall includes a gas injection inlet, wherein said top and opposed side walls terminate at an intersection with a boundary of the base and said bottom wall terminates outwardly from a line at least substantially perpendicular to said gas injection inlet and inward from said boundary, and wherein an interior surface of at least one of said top and opposed side walls tapers outwardly.

12. The molten metal pump of claim 11 wherein said outlet passage comprises a block configured for mating with a pump chamber exit.

13. The molten metal pump of claim 11 wherein said base is comprised of graphite.

\* \* \* \* \*